US008154383B2

(12) United States Patent
Brombach et al.

(10) Patent No.: US 8,154,383 B2
(45) Date of Patent: Apr. 10, 2012

(54) SYSTEM AND METHOD FOR FACTORY KEY CODE DISPLAY WITH AN AUTOMOTIVE KEYLESS ENTRY SYSTEM

(75) Inventors: Ronald Patrick Brombach, Plymouth, MI (US); Mark Christian Aaron, Canton, MI (US); Lisa Therese Boran, Northville, MI (US); Daniel James Card, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 988 days.

(21) Appl. No.: 12/113,541

(22) Filed: May 1, 2008

(65) Prior Publication Data

US 2009/0273434 A1 Nov. 5, 2009

(51) Int. Cl.
*G08B 29/00* (2006.01)
*B60R 25/00* (2006.01)

(52) U.S. Cl. .................................... 340/5.72; 340/5.74

(58) Field of Classification Search .............. 340/5, 426; 307/10.3–10.5
See application file for complete search history.

(56) References Cited

U.S. PATENT DOCUMENTS

| | | | | |
|---|---|---|---|---|
| 6,097,306 | A * | 8/2000 | Leon et al. | 340/5.1 |
| 6,163,271 | A | 12/2000 | Yoshizawa et al. | |
| 6,703,721 | B1 * | 3/2004 | Kito | 307/10.3 |
| 7,145,495 | B2 | 12/2006 | Cooper | |
| 2005/0270138 | A1 | 12/2005 | Ikeda | |
| 2006/0082435 | A1 * | 4/2006 | Matsumoto et al. | 340/5.23 |

* cited by examiner

*Primary Examiner* — Daniel Wu
*Assistant Examiner* — John Bamert
(74) *Attorney, Agent, or Firm* — Brooks Kushman P.C.

(57) ABSTRACT

A system and method for providing keypad information to a user for a keypad coupled to an exterior portion of the vehicle is provided. The method includes receiving a first radio frequency (RF) signal from a first transmitter and increasing a first count in response to detecting the first RF signal. The method includes receiving a second RF signal from a second transmitter and increasing a second count in response to detecting the second RF signal. The method includes comparing the first count to a first predetermined count and comparing the second count to a second predetermined count. The method includes transmitting the keypad information to the display device based on at least one of the comparison of the first count to the first predetermined amount and the comparison of the second count to the second predetermined amount.

20 Claims, 3 Drawing Sheets

SYSTEM AND METHOD FOR FACTORY KEY CODE DISPLAY WITH AN AUTOMOTIVE KEYLESS ENTRY SYSTEM

BACKGROUND

1. Technical Field

The embodiments described herein generally relate to a system and method for factory key code display with keyless entry systems.

2. Background Art

Keypads are generally positioned on the exterior of a driver's door and are used to lock and unlock vehicles (among other features). The driver may unlock the door with the keypad in response to successfully inputting a factory code (a code which includes a sequence of numbers or other such characters) on the keypad. Such keypads allow the driver to unlock/lock the door without the use of a key. Generally, the keypad is electrically coupled to an electronic controller. The controller controls a mechanism to unlock/lock the vehicle in response to the factory code inputted by the driver via the keypad. Other such keyless entry systems may include remote frequency based transmitters operably coupled to the electronic controller. The electronic controller is configured to unlock/lock the doors of the vehicle in response to receiving RF encoded signals from the transmitters.

A customer may use the factory code to program a new code (or personalized code) which may be easier to remember in order to unlock the vehicle with the keypad. The customer is generally given a plastic card which includes the factory code printed thereon upon purchasing the vehicle. Often times, such cards are misplaced and/or lost. In the event the driver wants to use his/her keypad or intends to configure the keypad, such as changing the unlock code to a code that is personal to the driver for unlocking purpose, the driver may need the factory code in order to modify the unlock code. Such a task may be difficult to perform if the card is misplaced or lost. In order to obtain the original factory code if the card is misplaced or lost or not turned over to the new owner of the vehicle, the driver is forced to go to a vehicle dealership to obtain the factory code. Technicians at the dealership may electronically retrieve the code from an electronic controller via a diagnostic tool or retrieve the code printed on the module label (part removal may be necessary).

The key code cards used in connection with the keypad feature adds complexity and an unnecessary expense for vehicle manufacturers. For example, while the piece cost for each card is not very expensive, the total cost associated with providing such cards for a large number of vehicles may be expensive. The complexity is seen in production and service end items as well as assembly plant and service handling procedures. The cards are generally shipped into vehicle assembly plants with the electronic controller and a number of radio transmitters (or key fobs). In general, the key fobs and the cards are bundled together and placed in a bag and coupled to the controller with tape or other such temporary restraint mechanism.

While installing the electronic controller to the vehicle, an operator may be required to separate the bag containing the card and the key fobs. In some circumstances, during the installation process of the electronic controller, the separated bags cannot be retrieved or found once the vehicle is completely assembled. In such a case, a new bag containing a new card with a new key code and a new set of key fobs are placed in the vehicle and shipped with the vehicle to the dealership for customer prepping. When the vehicle, which includes a bag containing the new key code and new set of key fobs, arrives at the dealership, the vehicle must undergo servicing by the dealership to retrieve the old key code via the diagnostic tool in order to obtain the original factory code that is stored in the installed electrical controller. The dealership may not have the resources to write over the original key code in the electronic controller with the new key code as indicated on the new card. As such, the old factory code is still used, and the new key code card is discarded. The dealership retrieves the old factory code and provides another card with the old factory code printed thereon. The new key fobs are reprogrammed to the electronic controller. The new card with the original factory code is given to the user. As illustrated by the above example, three cards have been used to ultimately get the correct code on the card to the purchaser of the vehicle.

SUMMARY

In at least one embodiment, a method for providing keypad information to a user for a keypad coupled to an exterior portion of a vehicle is provided. The method includes receiving a first radio frequency (RF) signal from a first transmitter and increasing a first count in response to detecting the first RF signal. The method further includes receiving a second RF signal from a second transmitter and increasing a second count in response to detecting the second RF signal. The method further includes comparing the first count to a first predetermined count and the second count to a second predetermined count, and transmitting the keypad information to the display device based on at least one of the comparison of the first count to the first predetermined amount and the comparison of the second count to the second predetermined amount.

DETAILED DESCRIPTION

The embodiments of the present invention may eliminate a number of problems commonly associated with factory codes printed on key code cards. Such factory codes are used in connection with unlocking the vehicle or with performing configuration type operations related to the keypad.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
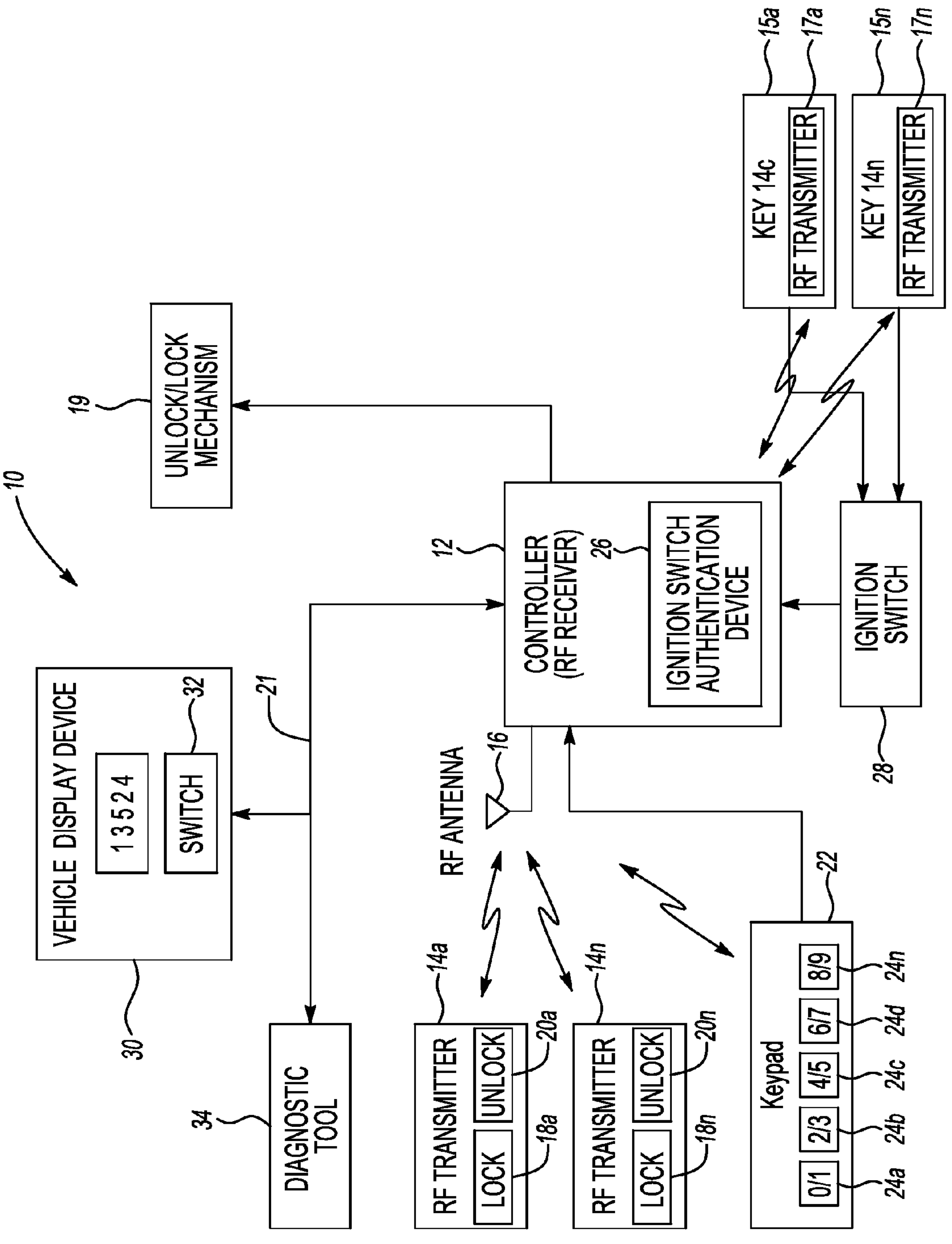
FIG. 1 depicts a system for displaying a factory key code for a keyless entry system in accordance to one embodiment of the present invention.
Figure 2:
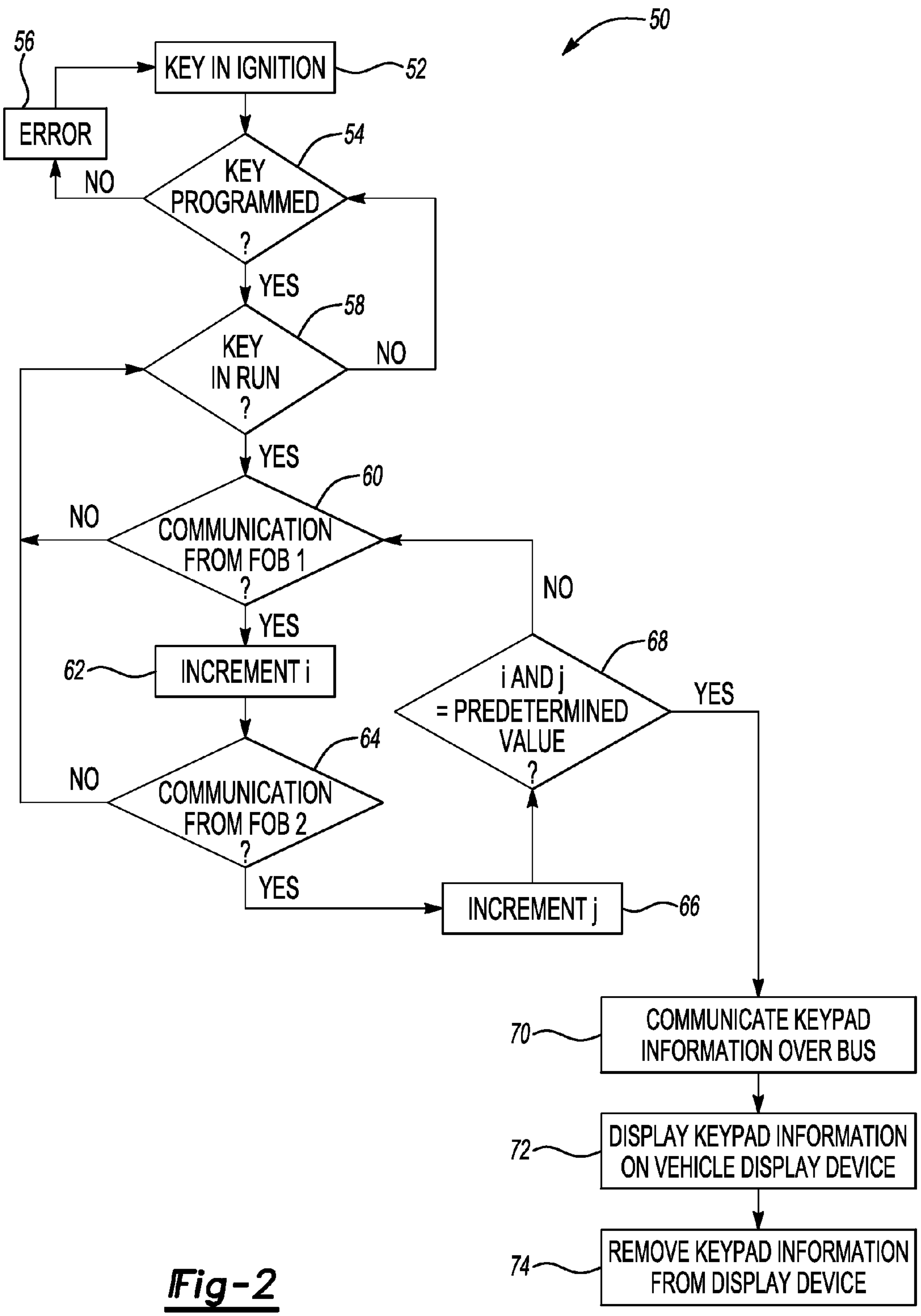
FIG. 2 depicts a flow diagram for displaying a factory key code for a keyless entry system in accordance to one embodiment of the present invention.

The embodiments of the present invention as set forth in FIGS. 1-2 generally illustrate and describe a plurality of controllers (or modules), or other such electrically based components for use in a keyless entry system of a vehicle. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired or intended to be implemented in the vehicle.

FIG. 1 depicts a keyless entry system 10 in accordance to one embodiment of the present invention. The system 10 includes a controller 12 having a radio frequency (RF) receiver stored therein. A first plurality of RF transmitters 14*a*-14*n* (or key fobs) are in communication with the RF receiver of the controller 12. An antenna 16 receives RF signals from the transmitters 14*a*-14*n* and delivers such signals to the RF receiver. An unlock/lock mechanism 19 is operably coupled to the controller 12. The controller 12 is configured to control the unlock/lock mechanism 19 to unlock/lock doors of the vehicle in response to the RF signals transmitted by the transmitters 14*a*-14*n*. Each transmitter 14*a*-14*n* includes a lock switch 18*a*, 18*n* and an unlock switch 20*a*, 20*n*. Accordingly, the controller 12 controls the unlock/lock mechanism 19 to lock the doors of the vehicle in response to a user depressing any one or more of the lock switches 18*a*-18*n* on the transmitters 14*a*-14*n*. The controller 12 controls the unlock/lock mechanism 19 to unlock doors of the vehicle in response to the user depressing any one or more of the unlock switches 20*a*-20*n*.

A keypad 22 is in electrical communication with the controller 12. The keypad 22 may be positioned on an exterior portion or section of the vehicle. In one example, the keypad 22 may be hardwired to the controller 12. In another example, the keypad 22 may be in RF communication with the controller 12 (e.g., via the RF antenna 16). The keypad 22 includes a plurality of switches 24*a*-24*n* which correspond to numeric characters, alpha characters or any combination of alphanumeric characters. The keypad 22 may transmit hardwired signals to the controller 12 which correspond to a sequence of numeric characters, alpha characters, or alpha-numeric characters in response to the user selecting various switches 24*a*-24*n*. In another example, the keypad 22 may transmit RF signals which correspond to the alpha, numeric, or alphanumeric characters to the controller 12 in response to the user selecting various switches 24*a*-24*n*. The controller 12 controls the unlock/lock mechanism 19 to unlock/lock the doors in response to receiving two or more signals (RF or hardwired) which correspond to a valid sequence of alpha, numeric, or alpha-numeric characters.

The controller 12 includes a factory code stored therein for comparison to codes transmitted by the keypad 22. The factory code generally corresponds to the code that is needed to unlock the vehicle for security purposes and for user configuration purposes. In one user configuration operation, a driver may utilize the factory code to setup a personalized code which is easier to remember to unlock the vehicle. For example, the user may input the factory code via the keypad 22 and then input the personalized code within a predetermined time frame to generate and store the personalized code in the controller 12. To unlock the door after the personalized code is setup, the controller 12 may use the personalized code stored therein for comparison to signals received from the keypad 22 to determine if the correct code (e.g. the personalized code) was input by the user prior to unlocking the vehicle.

The transmitters 14*a*-14*n* may be implemented in connection with a base remote entry system, a passive entry passive start (PEPS) system or a passive anti-theft system (PATS). With the PEPS system, the controller 12 may control the unlock/lock mechanism 19 to unlock the door in response to the controller 12 determining that the transmitter 14*a*-14*n* is a predetermined distance away from the vehicle. In such a case, the transmitter 14*a*-14*n* automatically (or passively) transmits encrypted RF signals (e.g., without user intervention) in order for the controller 12 to decrypt (or decode) the RF signals and to determine if the transmitters 14*a*-14*n* are within the predetermined distance and are authorized. It is to be noted that with the PEPS implementation, the transmitters 14*a*-14*n* also generate RF signals which correspond to encoded lock/unlock signals in response to a user depressing the lock switches 18*a*-18*n* or the unlock switches 20*a*-20*n*. In this aspect, the transmitters 14*a*-14*n* operate in a similar manner to the key fob. In addition, with the PEPS system, a key may not be needed to start the vehicle. The user in this case may be required to depress the brake pedal switch or perform some predetermined operation prior to depressing a start switch after the user has entered into the vehicle. In the PATS implementation, the transmitters 14*a*-14*n* operate as a conventional key fob in order to unlock/lock the vehicle. With the PATS implementation, one or more keys 15*a*-15*n* are generally needed to start the vehicle. The keys 15*a*-15*n* each include a second plurality of RF transmitters 17*a*-17*n*, respectively embedded therein.

The controller 12 includes an ignition switch authentication device 26. The ignition switch authentication device 26 may also include an RF receiver (not shown) and an antenna (not shown) for receiving RF signals transmitted by the RF transmitters 17*a*-17*n*. It should be noted that the ignition switch authentication device 26 may be implemented as a stand alone controller (or module). The ignition switch authentication device 26 is configured to authenticate the particular type of mechanism used to start the vehicle. For example, with the PATS implementation, the key 15*a* or 15*n* is inserted into an ignition switch 28 to start the vehicle. In such a case, the RF transmitter 17*a* or 17*n* transmits RF signals having encrypted data therein to the receiver of the ignition switch authentication device 26. The ignition switch authentication device 26 decrypts the data to authenticate the key prior to allowing the user to start the vehicle.

With the PEPS implementation, as noted above, a key is not needed to start the vehicle. In such a case, the ignition switch authentication device 26 authenticates the RF encrypted data passively transmitted by the transmitter 14*a*-14*n* to allow the user to start the engine of the vehicle. As noted above, in addition to the authentication device 26 authenticating the RF encrypted data, the user may perform a predetermined operation (e.g., pull handle of a door, or open door, toggle the break pedal switch, or other operation) prior to depressing a start switch to start the vehicle. The system 10 contemplates a number of other operations from those listed prior to depressing the start switch to start the vehicle.

A vehicle display device 30 is operably coupled to the controller 12 via a vehicle communication bus 21. The vehicle communication bus 21 may be implemented as a high/medium speed control area network (CAN) bus, a local interconnect network (LIN), a media oriented systems transport (MOST), or other such suitable bus communication network. The particular type of bus implemented may be varied to meet the desired criteria of a particular implementation.

The vehicle display device 30 may be positioned within the instrument cluster or center stack area of the vehicle (e.g., middle portion of instrument panel which includes climate control head, audio control module, etc.). In the case where the vehicle display device 30 is implemented within the instrument cluster, the vehicle display device 30 is generally defined as a message center. In another example, the vehicle display device 30 may be implemented within the audio control module or the climate control head. In general, the vehicle display device 30 may be implemented as a stand-alone mechanism or within any type of module or apparatus generally situated to display or provide information to the user.

The vehicle display device 30 includes a plurality of switches 32 for toggling through various screens or to select various menus depicted in the vehicle display device 30. In at least one embodiment, the vehicle display device 30 is configured to display the factory code and/or the personal code used by the user to unlock doors of the vehicle. The operation for displaying the factory code and/or the personal code will be discussed in more detail in connection with FIG. 2. A diagnostic tool 34 may be operably coupled to the controller 12 and the vehicle display device 30 via the multiplexed bus 21. The controller 12 and vehicle display device 30 may report diagnostic trouble codes or other such information generally associated with vehicle controller needed by a technician to troubleshoot vehicle problems with respect to operations performed by the controller 12, the vehicle display device 30 and additional vehicle controllers.

FIG. 2 depicts a method 50 for displaying information via the vehicle display device 30 in accordance to one embodiment of the present invention. While the method 50 is depicted as a flow diagram, it is to be understood that the operations described in connection with the method 50 may be implemented in any number of different sequences other than that illustrated.

In block 52, the ignition switch 28 receives the key 15*a* or 15*n* for the PATS implementation. The operation performed in block 52 may not be necessary for a vehicle that includes the PEPS implementation.

In block 54, ignition switch authentication device 26 determines if the key is successfully programmed to the vehicle by authenticating RF encrypted data transmitted by the RF transmitter 14*a* or 14*n* for a PATS implementation. If the key 15*a* or 15*n* is not used and a user uses any of the transmitters 14*a*-14*n* in connection with the PEPS system, the key ignition authentication device 26 determines whether the encrypted RF signals transmitted by transmitter 14*a*-14*n* are valid. If the key 15*a* or 15*n* is not programmed or the RF signals transmitted by the transmitter 14*a*-14*n* (for the PEPS implementation) are not valid, the method 50 moves to block 56. If the key 15*a* or 15*n* is programmed or the RF signals transmitted by transmitter 14*a*-14*n* are valid, the method 50 moves to block 58.

In block 56, an error is reported and the method 50 moves back to block 52.

In block 58, for the PATS implementation, the controller 12 determines whether the key 15*a* or 15*n* is in the "RUN" position. If the controller 12 determines that the key 15*a* or 15*n* is in the RUN position, then the method 50 moves to block 60. If the controller 12 determines that the key 15*a* or 15*n* is not in the RUN position, then the method 50 moves back to block 54. With the PEPS implementation, the controller 12 may determine whether the user entered the vehicle by monitoring door ajar status or whether the start button was depressed by the user.

In block 60, the controller 12 determines whether the user toggled any one or more of the switches 18*a*, 20*a* on the transmitter 14*a*. If the controller 12 has not determined that the user toggled any one or more of the switches 18*a*, 20*a* on the transmitter 14*a* (e.g., the controller 12 has not received any RF signals which correspond to the switches 18*a*, 20*a*), then the method 50 moves back to block 58. If the controller 12 receives a RF signal in response to the user toggling one or more of the switches 18*a*, 20*a* on the transmitter 14*a*, then the method 50 moves to block 62.

In block 62, the controller 12 increments a count i. In general, the controller 12 may set i to zero in response to the engine being turned off (for either the PEPS or PATS implementation), or after the key is inserted into the key ignition switch 28 (for the PATS implementation).

In block 64, the controller 12 determines whether the user toggled any one or more of the switches 18*n*, 20*n* on the transmitter 14*n*. If the controller 12 has not determined that the user toggled any one or more of the switches 18*n*, 20*n* on the transmitter 14*n* (e.g., the controller 12 has not received any RF signals which correspond to the switches 18*n*, 20*n*), then the method 50 moves back to block 58. If the controller 12 receives a RF signal in response to the user toggling a switch 18*n*, 20*n* on the transmitter 14*n*, then the method 50 moves to block 66.

In block 66, the controller 12 increments a count j. In general, the controller 12 may set j to zero in response to the engine being turned off (for either the PATS or PEPS implementation) or after the key is inserted into the key ignition switch 28 (for the PATS implementation). While not shown in FIG. 2, an additional operation may be added to determine whether i and j have achieved predetermined values within a predetermined time range for security purposes.

In block 68, the controller 12 determines whether the counts i and j are equal to predetermined values. The predetermined values for i and j may be equal to each other or different from one another. If the counts i and j are not equal to corresponding predetermined values, the method 50 executes blocks 60, 62, 64, and 66 (or loops through blocks 60-66) until both the i and j counts are equal to the predetermined values. If the counts i and j are equal to the predetermined values, then the method 50 moves to block 70.

In block 70, in response to the controller 12 determining that the variables i and j are equal to the predetermined values, the controller 12 transmits the factory code and/or the personalized code over the multiplexed bus 21 to the vehicle display device 30.

In block 72, the vehicle display device 30 displays the factory code and/or the personalized code (if the personalized code has been established). The vehicle display device 30 may be adapted to display the factory code and the personalized code in any manner, order or sequence that is generally contemplated.

In block 74, the vehicle display device 30 removes the factory code or the personalized code from the screen after a predetermined amount of time. Upon expiration of the predetermined amount of time for displaying the factory code, the vehicle display device 30 may then display the personalized code also for a predetermined amount of time. The particular length of time for displaying the factory code or the personalized code may vary based on the desired criteria of a particular implementation.

It should be noted that the method 50 contemplates the use of the keypad, or a single transmitter 14*a*-14*n* along with the keypad 22 to increment variables i and j. The method 50 also contemplates the use of a single transmitter 14*a* or 14*n*, to increment a single variable i or j for comparison to a single predetermined value to display the factory code card and the personalized code via the vehicle display device 30. The use of multiple transmitters 14*a*-14*n* and/or a single transmitter 14*a* or 14*n* along with the keypad 22 provides additional levels of security to ensure that the person requesting the factory code and/or the personalized factory code is properly authorized to obtain such information.

Figure 3:
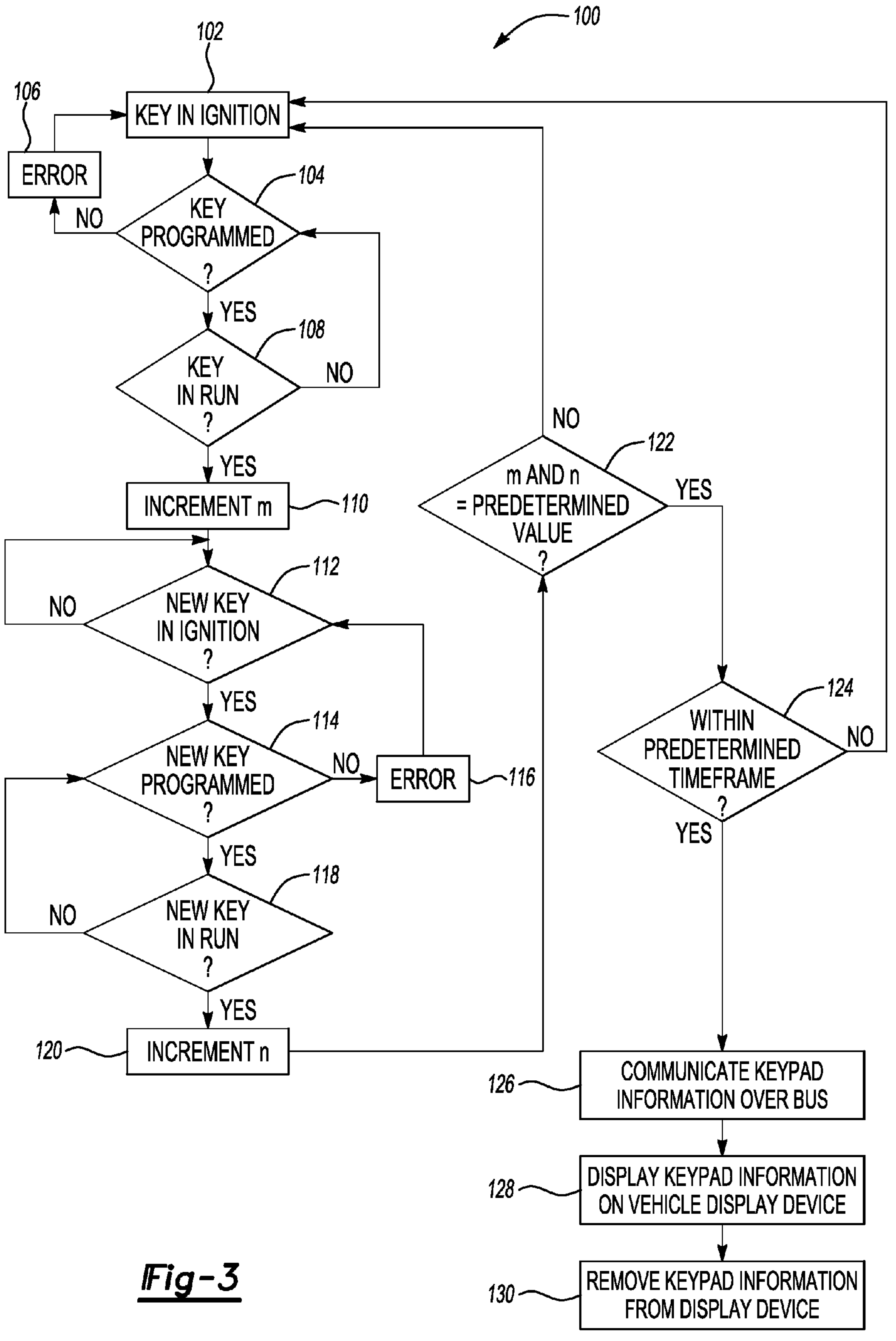
FIG. 3 depicts a flow diagram for displaying a factory key code for a keyless entry system in accordance to another embodiment of the present invention.

FIG. 3 depicts a method 100 for displaying information via the vehicle display device 30 in accordance to another embodiment of the present invention. In general, the method 100 applies to the keys 15*a* and 15*n* as used in connection with the PATS implementation. While the method 100 is depicted as a flow diagram, it is to be understood that the operations described in connection with the method 100 may be implemented in any number of different sequences other than that illustrated.

In block 102, the ignition switch 28 receives the key 15*a* or 15*n*.

In block 104, the ignition switch authentication device 26 determines if the key 15*a* or 15*n* is successfully programmed to the vehicle by authenticating RF encrypted data transmitted by the RF transmitter 17*a* or 17*n*. If the key 15*a* or 15*n* is not programmed, then the method 100 moves to block 106. If the key 15*a* or 15*n* is programmed, then the method 100 moves to block 108.

In block 108, the controller 12 determines whether the key 15*a* or 15*n* is in the "RUN" position. If the controller 12 determines that the key 15*a* or 15*n* is in the RUN position, then the method 100 moves to block 110. If the controller 12 determines that the key 15*a* or 15*n* is not in the RUN position, then the method 100 moves back to block 104.

In block 110, the controller 12 increments a count m. The method 100 contemplates that the count m may be incremented in response to performing the operation in block 104 and/or performing the operation in block 108.

In block 112, a new key is presented to the ignition switch 28 that is different from the key presented to the ignition switch 28 as noted in connection with block 102. If the new key is not presented to the ignition switch 28, then the method 100 remains in block 112. If a new key is presented to the ignition switch 28, then the method 100 moves to block 114.

In block 114, the ignition switch authentication device 26 determines if the key 15*a* or 15*n* is successfully programmed to the vehicle by authenticating RF encrypted data transmitted by the RF transmitter 17*a* or 17*n*. If the key 15*a* or 15*n* is not programmed, then the method 100 moves to block 116. If the key 15*a* or 15*n* is programmed, then the method 100 moves to block 118.

In block 118, the controller 12 determines whether the key 15*a* or 15*n* is in the "RUN" position. If the controller 12 determines that the key 15*a* or 15*n* is in the RUN position, then the method 100 moves to block 120. If the controller 12 determines that the key 15*a* or 15*n* is not in the RUN position, then the method 100 moves back to block 114.

In block 120, the controller 12 increments a count n. The method 100 contemplates that the count n may be incremented in response to performing the operation in block 114 and/or block 118.

In block 122, the controller 12 determines whether the counts m and n are equal to predetermined values. The predetermined values for m and n may be equal to each other or different from one another. If the counts m and n are not equal to corresponding predetermined values, the method 100 moves to block 102. If the counts m and n are equal to predetermined values, then the method 100 moves to block 124. In general, the predetermined value may generally be set to one when used in connection with FIG. 3. As such, a user may perform the operation of inserting each key 15*a* or 15*n* in the ignition switch 28 and/or authenticate each key 15*a* or 15*n* with the RF signals transmitted by the corresponding transmitters 17*a* and 17*n* once. However, in some circumstances it may be optimal to require multiple insertions of one or more of the keys 15*a* or 15*n* for additional security. The method 100 generally contemplates multiple insertions of one or more of the keys 15*a* or 15*n*.

In block 124, the controller 12 determines whether the counts m and n have reached corresponding predetermined values within a predetermined time frame. Such a predetermined time frame may be in the range of 1 second to 60 seconds. The method 100 generally contemplates that a number of values may be established to correspond to a particular time frame. Such a predetermined time frame may vary based on the desired criteria of a particular application. In the event the controller 12 determines that the counts m and n have not reached corresponding predetermined values within the predetermined time frame, the method 100 moves to block 102. In the event the controller 12 determines that the counts m and n have reached corresponding predetermined values within the predetermined time frame, the method 100 moves to block 126.

In block 126, the controller 12 transmits the factory code and/or the personalized code over the multiplexed bus 21 to the vehicle display device 30.

In block 128, the vehicle display device 30 displays the factory code and/or the personalized code (if the personalized code has been established). The vehicle display device 30 may be adapted to display the factory code and the personalized code in any manner, order or sequence that is generally contemplated or foreseeable.

In block 130, the vehicle display device 30 removes the factory code and/or the personalized code from the display after a predetermined amount of time. Upon expiration of the predetermined amount of time for displaying the factory code, the vehicle display device 30 may then display the personalized code also for a predetermined amount of time. The particular length of time for displaying the factory code and/or the personalized code may vary based on the desired criteria of a particular implementation.

In general, while the method 100 discloses the use of multiple keys (or different keys that are different from one another), the method 100 may also contemplate the use of a single key. For example, in such a case, blocks 112, 114, 116, 118 and 120 may be removed and block 110 may move directly to block 122 to determine if count m is equal to the predetermined value. In the event count m is not equal to the predetermined value, the method 100 may move back to block 102 to allow the user to present the same key back to the ignition switch 28 to increase the count m to determine if the increased count is equal to the predetermined value. In such a case, it may be easier to display the factory code since multiple keys may not be needed. The use of multiple keys 15*a* or 15*n* provides additional levels of security to ensure that the person requesting the factory code and/or the personalized code is properly authorized to obtain such information.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for providing keypad information to a user, the method comprising:

receiving a first wireless signal from a first transmitter;

increasing a first count in response to the first wireless signal;

receiving a second wireless signal from a second transmitter;

increasing a second count in response to the second wireless signal;

comparing the first count to a first predetermined count, comparing the second count to a second predetermined count; and transmitting the keypad information to a display device based on the comparison of the first count to the first predetermined count and the comparison of the second count to the second predetermined count.

2. The method of claim 1 further comprising receiving the keypad information via a keypad positioned exterior to a vehicle to one of unlock and lock the vehicle.

3. The method of claim 1 wherein the keypad information corresponds to a code that enables entry within a vehicle.

4. The method of claim 1 wherein the keypad information corresponds to a first code comprising one of a series of numeric characters, alpha characters, and alpha-numeric characters that is selected by a user and programmed into a vehicle via a keypad positioned exterior to the vehicle to enable entry within the vehicle.

5. The method of claim 1 further comprising determining an ignition status of a vehicle prior to receiving the first wireless signal and prior to receiving the second wireless signal.

6. The method of claim 1 further comprising determining an ignition status of a vehicle prior to increasing the first count and prior to increasing the second count.

7. The method of claim 6 wherein determining the ignition status further comprises determining whether at least one key is in a RUN position.

8. The method of claim 1 further comprising transmitting the keypad information over a communication bus prior to transmitting the keypad information to the display device.

9. A method for providing an access code to a vehicle, the method comprising:

receiving a first wireless signal from a first transmitter;

increasing a first count in response to the first wireless signal;

receiving a second wireless signal from a second transmitter;

increasing a second count in response to the second wireless signal;

comparing the first count to a first predetermined count and the second count to a second predetermined count; and transmitting the access code to a user if the first and second counts are equal to the first and the second predetermined counts, respectively.

10. The method of claim 9 further comprising receiving the access code via a keypad positioned exterior to a vehicle to one of unlock and lock the vehicle.

11. The method of claim 9 wherein the access code corresponds to one of a series of numeric characters, alpha characters, and alpha-numeric characters that enables entry within the vehicle.

12. The method of claim 9 wherein the access code corresponds to one of a series of numeric characters, alpha characters, and alpha-numeric characters that is selected by a user and programmed into the vehicle via a keypad positioned exterior to the vehicle to enable entry within the vehicle.

13. The method of claim 9 further comprising determining an ignition status of the vehicle prior to receiving the first wireless signal and prior to receiving the first wireless signal.

14. The method of claim 9 further comprising determining an ignition status of the vehicle prior to increasing the first count and prior to increasing the second count.

15. The method of claim 14 wherein determining the ignition status further comprises determining whether at least one key is in a RUN position.

16. The method of claim 9 further comprising transmitting the access code over a communication bus prior to transmitting the access code to the display device.

17. An apparatus comprising:

a vehicle controller configured to:

receive a first wireless signal from a first transmitter;

increase a first count in response to the first wireless signal;

receive a second wireless signal from a second transmitter;

increase a second count in response to the second wireless signal;

compare the first count to a first predetermined count, compare the second count to a second predetermined count; and transmit keypad information to a display device based on the comparison of the first count to the first predetermined count and the comparison of the second count to the second predetermined count.

18. The apparatus of claim 17 wherein the vehicle controller is further configured to receive the keypad information via a keypad positioned exterior to a vehicle to one of unlock and lock a vehicle.

19. The apparatus of claim 17 wherein the keypad information corresponds to a code that enables entry within a vehicle.

20. The apparatus of claim 17 wherein the keypad information corresponds to one of a series of numeric characters, alpha characters, and alpha-numeric characters that is selected by a user and programmed into a vehicle via a keypad positioned exterior to the vehicle to enable entry within the vehicle.

* * * * *